United States Patent [19]

Kajimoto et al.

[11] Patent Number: 4,680,369

[45] Date of Patent: Jul. 14, 1987

[54] SULFUR-CONTAINING POLYURETHANE BASE LENS RESIN

[75] Inventors: Nobuyuki Kajimoto; Akihiro Tamaki; Teruyuki Nagata, all of Omuta, Japan

[73] Assignee: Mitsui Toatsu Chemicals, Incorporated, Tokyo, Japan

[21] Appl. No.: 843,222

[22] Filed: Mar. 24, 1986

[51] Int. Cl.$^4$ .............................................. C08G 18/38
[52] U.S. Cl. ......................................... 528/76; 528/85
[58] Field of Search ..................................... 528/76, 85

[56] References Cited

U.S. PATENT DOCUMENTS

| | | | |
|---|---|---|---|
| 3,312,743 | 4/1967 | Schmelzer et al. | 528/76 |
| 3,579,591 | 5/1971 | Schnell et al. | 528/76 |
| 4,059,570 | 11/1977 | Oswald | 528/76 |
| 4,373,084 | 2/1983 | Robinson | 528/76 |

*Primary Examiner*—Maurice J. Welsh
*Attorney, Agent, or Firm*—Oblon, Fisher, Spivak, McClelland, & Maier

[57] ABSTRACT

A sulfur-containing polyurethane base lens resin is obtained by reacting one or more isocyanate compounds, which have two or more NCO groups, with one or more OH-containing compounds, which have two or more OH groups, in such proportions that the molar ratio of NCO groups to OH groups ranges from 0.5 to 1.5. At least one of said one or more OH-containing compounds contains one or more sulfur atoms in the molecule thereof. The total content of sulfur atoms in all OH-containing compounds is 20 wt. % or higher.

2 Claims, No Drawings

SULFUR-CONTAINING POLYURETHANE BASE LENS RESIN

BACKGROUND OF THE INVENTION (1) Field of the Invention

This invention relates to a sulfur(S-containing polyurethane base lens resin having a high refractive index and good machinability such as high degrees of easiness in its cutting and polishing (hereinafter called "cutting and polishing easiness" for the sake of brevity).

(2) Description of the Prior Art

In Japan, more and more plastic lenses have recently been employed as eyeglass lenses and camera lenses and in optical devices, since they are lighter and less fragile compared with inorganic glass lenses and permit coloration. As a representative resin employed widely for the above purposes these days, may be mentioned a radical polymerization product of diethylene glycol bisallyl carbonate. The radical polymerization product will hereinafter be abbreviated as "DAC resin". Although the DAC resin has various advantages such as excellent impact resistance, reduced temperature dependency of lenses' refractive powers, light weight, superb colorability, good machinability such as good cutting and polishing easiness, etc., it cannot be considered to have sufficient properties as a resin for lenses in view of the recent trend toward fashion-oriented lenses in the field of eyeglass lenses.

As the most serious drawback of the DAC resin, its refractive index is smaller compared with those of inorganic lenses (refractive index of a typical inorganic lens, $N_D^{20°\ C.}$: 1.52; refractive index of a DAC resin lens $N_D^{20°\ C.}$: 1.50). When the DAC resin is molded into a lens, the lens has a greater thickness. In the case of high refractive-power eyeglass lenses for the near-sighted in particular, the lenses have great peripheral thicknesses. Use of the DAC resin cannot achieve weight reduction and moreover results in eyeglass lens of poor visual attraction. Accordingly, lenses which make use of the DAC resin as a raw material are pronely shunned due to the recent tendency to place importance on fashionability.

For the reasons mentioned above, there is an outstanding demand for a lens resin having a higher refractive index than the DAC resin, in other words, capable of providing thinner lens thicknesses than the DAC resin.

Certain urethane base resins have been known as typical lens resins capable of achieving high refractive indexes. For example, there has been known a urethane resin obtained by a reaction of an isocyanate compound with a hydroxyl-containing compound such as diethylene glycol (Japanese Patent Laid-Open No. 136601/1982 or 136602/1982) or with a halogen- and hydroxyl-containing compound such as tetrabromobisphenol A (Japanese Patent Laid-Open No. 164615/1983).

These urethane-base resins are however unable to obtain refractive indexes beyond a certain level. In order to obtain a resin having a refractive index, $N_D^{20°\ C.}$, in the neighborhood of about 1.60 or higher, it is indispensable to use an aromatic isocyanate and/or a monomer containing many halogen atoms as substituents therein. However, use of such monomers leads to a drawback in external appearance that the resultant resin is colored and another drawback in chemical and physical properties that the resultant resin has poor weatherability and poor cutting and polishing easiness.

SUMMARY OF THE INVENTION

The principal object of this invention is to provide a lens resin which has a refractive index substantially equal to or higher than than the above-described urethane-base resins, is free of defects in external appearance such as coloration and enjoys excellent weatherability and good machinability such as good cutting and polishing easiness.

The present inventors have carried out an extensive investigation with a view toward attaining the above object of this invention, leading to completion of this invention.

In one aspect of this invention, there is thus provided a sulfur-containing polyurethane base lens resin obtained by reacting one or more isocyanate compounds, which have two or more NCO groups, with one or more OH-containing compounds, which have two or more OH groups, in such proportions that the ratio of NCO groups to OH groups ranges from 0.5 to 1.5. At least one of said one or more OH-containing compounds contains one or more sulfur atoms in the molecule. The total content of sulfur atoms in all OH-containing compounds is 20 wt. % or higher.

When the sulfur-containing polyurethane base lens of this invention is used, a lens having a very high refractive index can be obtained. Indeed, in case kinds of an isocyanate compound and an OH-containing compound are fitly selected, a refractive index ($N_D^{20°\ C.}$) as high as 1.60 or even higher can easily be obtained. In addition, it is free of defects in external appearance such as coloration and also excellent in weatherability. Further, the above-described conventional urethane-base resins showed poor machinability such as poor cutting and polishing easiness unless a trifunctional or higher compound was incorporated. The resin of this invention has good machinability such as good cutting and polishing easiness, which is required for lens resins, without absolute need for incorporation of any trifunctional three-dimensionally crosslinking agent.

The above and other objects, features and advantages of this invention will become apparent from the following description and the appended claims.

DETAILED DESCRIPTION OF THE INVENTION AND PREFERRED EMBODIMENTS

In the present invention, one or more isocyanate compounds can be used as one of the two types of starting raw materials. However, a major fraction of the starting isocyanate raw material may preferably be composed of a diisocyanate. The one or more isocyanate compounds may be either aromatic or aliphatic. Aromatic isocyanate compounds may be nucleus-substituted by one or more halogens and/or the like. As these isocyanate compounds, may, for example, be mentioned m-xylylene diisocyanate, p-xylylene diisocyanate, tetrachloro-m-xylylene diisocyanate, tetrachloro-p-xylylene diisocyanate, hexamethylene diisocyanate, isophorone diisocyanate, tolylene diisocyanate, 4,4'-diphenylmethane diisocyanate, the biuret reaction product of hexamethylene diisocyanate, the adduct reaction product of hexamethylene diisocyanate and trimethylolpropane, 4,4'-dichlorohexylmethane diisocyanate and 2-isocyanatoethyl 2,6-diisocyanatohexanoate. Among these isocyanate compounds, particularly-preferable isocyanate compounds are aromatic diisocyanates, in each of which two side-chain alkyl groups have been substituted by two NCO groups, such as m-xylylene diisocyanate, and aliphatic diisocyanates such as hexamethylene diisocyanate.

On the other hand, one or more OH-containing compounds, each of which contains one or more sulfur atoms in its molecule, can be used as the other starting raw material. However, a major fraction of the starting OH-containing raw material must be composed of a compound containing two or more OH groups. As these compounds each of which contains one or more sulfur atoms in its molecule, may, for example, be mentioned di(2-hydroxyethyl) sulfide, 1,2-bis-(2-hydroxyethylmercapto)ethane, bis-(2-hydroxyethyl)-disulfide, 1,4-dithian-2,5-diol and so on.

In the present invention, one or more of these OH-containing compounds each of which contains one or more sulfur atoms in its molecule may be used either by themselves or in combination with an OH-containing compound which does not contain any sulfur atom. Regardless of the type of each OH-containing compound employed, the desired resin which the present invention intends to provide cannot be obtained unless one or more OH-containing compounds containing at least 20 wt. % or preferably 25-40 wt. % of sulfur atoms in total in their molecules are used upon their reactions with the one or more isocyanate compounds.

It is necessary to use these OH-containing compounds, each of which contains one or more sulfur atoms, and the above-mentioned isocyanate compounds in such proportions that the NCO/OH ratio falls within a range of 0.5-1.5. Outside this range, the resultant resin may not be hardened to any sufficient extent or various other properties as a lens resin, which the present invention intends to provide, may be reduced.

In order to obtain high-hardness lenses within the above group ratio range, it is preferable as the isocyanate and the OH-containing starting raw materials, in addition to those having two functional (NCO or OH) groups, to suitably add an isocyanate compound containing three or more NCO groups and/or a polyol such as trimethylolpropane or pentaerythritol as three-dimensionally crosslinking agents.

Besides, it is also feasible, without causing any problems or inconvenience, to add a radical-polymerizable raw material such as diethylene glycol bis(allyl carbonate) (DAC), an acrylic ester, a methacrylic ester or a styrene derivative along with its radical polymerization initiator, an ultraviolet absorbent and/or antioxidant for improving the light resistance, etc. in small amounts depending what requirements would be imposed as a lens resin, so long as these additional components do not prevent the attainment of the object of this invention.

The lens resin of this invention can be produced in the following manner.

Casting polymerization is usually used to produce lenses. Casting polymerization is also preferred in the present invention. First of all, the one or more isocyanate compounds (hereinafter called "Component A" for the sake of brevity) and the one or more OH-containing compounds at least one of which contains one or more sulfur atoms in its molecule (hereinafter called "Component B" for the sake of brevity) are mixed in such proportions that the NCO/OH ratio falls within the range of 0.5-1.5, followed by their stirring. Upon formation of a uniform liquid mixture, it is deaerated. Thereafter, the mixture is poured in a glass- or metal-made mold, in which the reaction of both components is allowed to proceed at a suitable temperature so as to harden the liquid mixture. Component A and Component B may, in many instances, separate into two layers in an incipient period of their mixing. As their mixing proceeds, the reaction between Component A and Component B is also allowed to proceed further so that the two layers make up a single uniform layer. Even when the deaeration of the uniform liquid mixture has been effected sufficiently, the reaction may explosively proceed in the mold depending on the type of Component A or Component B and the reaction may thus be accompanied by occurrence of bubbles. In order to avoid such a phenomenon, it is necessary to conduct the polymerization reaction while effecting sufficient heat removal and precise temperature control. Although the reaction time and reaction temperature vary depending on the combination of Component A and Component B, the polymerization is generally carried out at $-20°$ C.$-80°$ C. for 24 hrs.-72 hrs. The hardness of the polymer resulting from the reaction reaches the maximum at the time point where the polymerization reaction has been completed and it does not increase beyond that maximum level. The polymerization may be stopped at or before the above-mentioned time point. As a matter of fact, the polymerization may be stopped at any time point so long as the resultant resin has sufficient properties as an eyeglass lens of a high refractive index which the present invention intends to provide. Since the starting two-component system is not uniform in many instances in the above polymerization as mentioned above, it is particularly important to pour and harden the mixture of the two components after thoroughly stirring and mixing the two components and forming a completely-uniform single layer prior to their pouring.

In addition to the higher refractive index, the resin of this invention obtained in the above-described manner has inter alia the following advantages over conventionally known lens resins, because it contains S atoms in its backbone.
1. It provides tough plastic lenses.
2. It is colorless and transparent.
3. It has excellent impact resistance.
4. It has good cutting and polishing easiness and is hence superior in machinability.
5. It has a relatively small shrinkage factor upon its molding and polymerization.
6. It has a relatively low specific gravity and thus a light weight.

In order to apply some surface modification such as antireflection, higher hardness, improved abrasion resistance, improved chemical resistance, fog resistance and/or the like, some additional known physical and/or chemical treatments may also be applied to a lens which makes use of the resin of this invention as its resin component.

Having generally described the invention, a more complete understanding can be obtained by reference to certain specific Examples and Comparative Examples, which are provided herein for purposes of illustration only and are not intended to be limiting unless otherwise specified.

EXAMPLE 1

Mixed were 9.4 g (0.050 mole) of m-xylylene diisocyanate as Component A and 4.3 g (0.050 mole) of di(2-hydroxyethyl) sulfide as Component B. The resultant mixture was stirred at room temperature or so. Upon completion of a uniform mixture, it was deaerated under ice-cooling. The liquid mixture was then poured into a glass-made lens mold which had been treated in advance by making it hydrophobic or coating a parting agent thereon so as to facilitate its parting from a resin to be formed therein. The liquid mixture was allowed to undergo a reaction at 0° C. for 3 hours and then at 20° C. for 20 hours, thereby hardening same.

The resultant lens molding was extremely tough, colorless and transparent, and had good impact resistance and good cutting and polishing easiness. Its refractive index ($N_D^{20°\,C.}$) was as high as 1.59 while its specific gravity was 1.34. Results are shown in Table 1.

EXAMPLES 2-4

In the same manner as in Example 1, Component A and Components B described in Table 1 were mixed, homogenized, deaerated, poured into a glass-made lens mold and then hardened. Results are shown in Table 1.

Comparative Example 1

In Table 1, the following abbreviations will be used.

(1) m-XDI for m-xylylene diisocyanate:

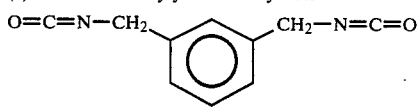

(2) TC-m-XDI for tetrachloro-m-xylylene diisocyanate:

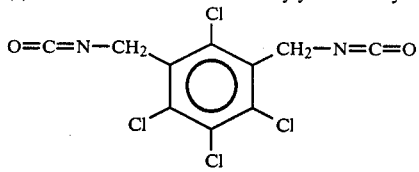

(3) HDI for hexamethylene diisocyanate:

$O=C=N+CH_2)_6N=C=O$

TABLE 1

| | Raw material for polymerization | | | Property of polymer | | | |
|---|---|---|---|---|---|---|---|
| | Component A Polyisocyanate | Component B S-containing polyol | NCO/OH ratio | Refractive index $N_D^{20°\,C.}$ | Cutting and polishing easiness* | Specific gravity | External appearance |
| Ex. 1 | m-XDI (0.050 mole) | $HOC_2H_4SC_2H_4OH$ (0.050 mole) | 1.0 | 1.59 | O | 1.24 | colorless, transparent |
| Ex. 2 | m-XDI (0.050 mole) | $HOC_2H_4SC_2H_4SC_2H_4OH$ (0.050 mole) | 1.0 | 1.60 | O | 1.28 | colorless, transparent |
| Ex. 3 | TC-m-XDI (0.050 mole) | $HOC_2H_4SC_2H_4OH$ (0.050 mole) | 1.0 | 1.61 | O | 1.26 | colorless, transparent |
| Ex. 4 | HDI (0.050 mole) | $HOC_2H_4SC_2H_4OH$ (0.050 mole) | 1.0 | 1.56 | O | 1.22 | colorless, transparent |
| Comp. Ex. 1 | m-XDI (0.050 mole) | $HOC_2H_4OC_2H_4OH$ (0.050 mole) | 1.0 | 1.56 | X | 1.18 | colorless, transparent |
| Comp. Ex. 2 | m-XDI (0.050 mole) | 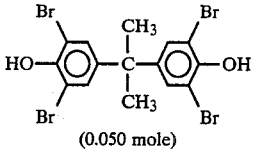 (0.050 mole) | 1.0 | 1.61 | Δ | 1.52 | pale yellow, transparent |
| Comp. Ex. 3 | HDI (0.050 mole) | $HOC_2H_4OC_2H_4OH$ (0.050 mole) | 1.0 | 1.50 | X | 1.16 | colorless, transparent |

*O: good,
Δ: relatively poor,
X: poor.

Mixed were 9.4 g (0.050 mole) of m-xylylene diisocyanate and 5.3 g (0.050 mole) of diethylene glycol. The resultant mixture was heated with stirring at 40°-50° C., thereby obtaining a homogeneous mixture. It was then cooled with water to remove reaction heat.

After deaeration, the liquid mixture was poured in a glass-made lens mold similar to that employed in Example 1 and was then hardened at 20°-30° C. for 48 hours. As understood from the results shown in Table 1, the resultant lens molding was colorless and transparent and had good impact resistance. Its refractive index ($N_D^{20°\,C.}$) was 1.56 and its specific gravity was as light as 1.18. However, the cutting and polishing easiness was poor.

COMPARATIVE EXAMPLES 2-3

In the same manner as in Example 1 and Comparative Example 1, Component A and Component B were mixed into a uniform mixture. After deaeration, the mixture was poured in a glass-made lens mold, in which it was hardened. Results are shown in Table 1.

Having now fully described the invention, it will be apparent to one of ordinary skill in the art that many changes and modification can be made thereto without departing from the spirit or scope of the invention as set forth hereon.

What is claimed is:

1. A sulfur-containing polyurethane base lens resin obtained by reacting one or more isocyanate compounds, which have two or more NCO groups, with one or more OH-containing compounds selected from the group consisting of di(2-hydroxyethyl)sulfide, 1,2-bis(2-hydroxyethylmercapto)-ethane, bis(2-hydroxyethyl)disulfide and 1,4-dithian-2,5-diol, in such proportions that the ratio of NCO groups to OH groups ranges from 0.5 to 1.5, at least one of said one or more OH-containing compounds containing one or more sulfur atoms in the molecule thereof, and the total content of sulfur atoms in all OH-containing compounds being 20 wt. % or higher.

2. A sulfur-containing polyurethane base resin as claimed in claim 1, wherein said one or more OH-containing compounds are di(2-hydroxyethyl)sulfide and/or 1,2-bis-(2-hydroxyethylmercapto)ethane.

* * * * *